(12) United States Patent
Irikura et al.

(10) Patent No.: US 7,234,299 B2
(45) Date of Patent: Jun. 26, 2007

(54) HYDRAULIC TRANSAXLE

(76) Inventors: Koji Irikura, 1428 Darbec Dr., Morristown, TN (US) 37814; Ryota Ohashi, 2-18-1, Inadera, Amagasaki-shi, Hyogo (JP); Hiroshi Tottori, 2-18-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 11/278,243

(22) Filed: Mar. 31, 2006

(65) Prior Publication Data

US 2006/0174615 A1    Aug. 10, 2006

Related U.S. Application Data

(63) Continuation of application No. 10/883,729, filed on Jul. 6, 2004, now Pat. No. 7,043,908.

(51) Int. Cl.
*F16D 39/00*    (2006.01)

(52) U.S. Cl. .............................. 60/454; 60/468; 60/487

(58) Field of Classification Search .................. 60/454, 60/468, 487

See application file for complete search history.

(56) References Cited

U.S. PATENT DOCUMENTS

| | | | |
|---|---|---|---|
| 5,201,692 A | | 4/1993 | Johnson et al. |
| 6,076,428 A | * | 6/2000 | Thoma et al. ................ 60/487 |
| 6,185,936 B1 | * | 2/2001 | Hauser et al. ................ 60/468 |
| 6,915,872 B2 | | 7/2005 | Wiley et al. |

* cited by examiner

*Primary Examiner*—Igor Kershteyn
(74) *Attorney, Agent, or Firm*—Sterne, Kessler, Goldstein & Fox P.L.L.C.

(57) ABSTRACT

An integrated hydraulic transaxle (IHT) comprises a hydrostatic transmission (HST), an axle driven by the HST, and a housing incorporating the HST and the axle. The HST includes a variable displacement hydraulic pump driven by a prime mover, and a hydraulic motor fluidly connected to the hydraulic pump. The hydraulic pump has a trunnion type movable swash plate. The internal displacement of the hydraulic motor is larger than the internal displacement of the hydraulic pump so as to increase the hydraulic deceleration activity of the HST. In the IHT, a mechanical deceleration drive train is interposed between the hydraulic motor and the axle. The mechanical deceleration activity of the mechanical deceleration drive train is reduced so far as the increase of the hydraulic deceleration activity of the HST.

8 Claims, 17 Drawing Sheets

HYDRAULIC TRANSAXLE

CROSS-REFERENCE TO RELATED APPLICATION

The present application is a Continuation of application Ser. No. 10/883,729, filed Jul. 6, 2004 now U.S. Pat No. 7,043,908, which is incorporated in its entirety herein by reference thereto.

BACKGROUND OF THE INVENTION

1. Field of the Invention

The invention relates to an integrated hydraulic transaxle (IHT); i.e., IHT incorporating a hydrostatic transmission (HST) and an axle, and preferably, a mechanical deceleration drive train interposed between the HST and the axle.

2. Related Art

There is a well-known conventional hydraulic transaxle, i.e., IHT, which has a transmission casing integrally incorporating an HST, an axle, and a mechanical deceleration drive train (gearing) interposed between the HST and the axle. The HST comprises a hydraulic pump and motor fluidly connected to each other, wherein the hydraulic pump and/or motor has a movable swash plate for changing its displacement.

Reduction of the deceleration ratio of a mechanical deceleration drive train in an IHT is advantageous in minimizing and simplifying the IHT and reducing noise generated from the IHT. If the deceleration ratio of the mechanical deceleration drive train in an IHT is reduced, the HST is requested to increase its deceleration ratio between the hydraulic pump and motor so as to compensate for the reduction of deceleration ratio of the mechanical deceleration drive train. U.S. Pat. No. 5,201,692, for example, discloses a conventional IHT having an HST, in which the internal displacement of hydraulic pump is smaller than the internal displacement of hydraulic motor so as to increase the deceleration ratio of the HST.

In a usual HST, internal displacements of the pump and motor are equal to each other so that the maximum rotary speeds of the pump and motor are equal to each other. In this state, reciprocation of pistons in a cylinder block of the pump is synchronous to reciprocation of pistons in a cylinder block of the motor, thereby generating large vibration and noise. In the HST disclosed in the document, the difference of internal displacement between the hydraulic pump and the motor, such as not to synchronize the rotational frequency of the pump to that of the motor, is also advantageous to reduce vibration and noise.

In the IHT disclosed in the above document, the axial piston type hydraulic pump is provided with a cradle type movable swash plate. The cradle type movable swash plate has an arcuately convex surface slidably fitting to an arcuately concave inner surface of the IHT housing or a retainer fitted therealong. The concave surface of the IHT housing or the retainer must be so long as to ensure the sufficient slide range of the swash plate, thereby expanding the IHT housing. Further, the concave surface must be processed to resist strain, thereby increasing the manufacturing cost of the IHT. The fitting of surfaces between the swash plate and the IHT housing is subject to contamination and causes frictional resistance to reduce the efficiency of operational force for moving the swash plate. Thus, the disclosed IHT involves some obstacles in the way of being reduced in size and costs while ensuring its durability.

Furthermore, in the IHT disclosed in the above document, the hydraulic motor extends a motor shaft relatively rotatably penetrating a center section on which the hydraulic pump and motor are mounted and fluidly connected to each other through a closed fluid circuit therein. The peripheral surface area of the motor shaft slidably rotatably contacting the center section or a thrust bearing therebetween is considerably large so as to reduce the efficiency of transmitting power from the hydraulic motor to the motor shaft.

Such a loss of transmission efficiency is disadvantageous to minimize the HST because the HST must have such a large displacement as to absorb the loss.

SUMMARY OF THE INVENTION

A first object of the present invention is to provide an IHT, i.e., an integrated hydraulic transaxle comprising a housing incorporating a hydrostatic transmission (HST) and an axle driven by the HST, wherein the HST is improved to facilitate for its reduction of noise and variation, and means for changing variable displacement of a hydraulic pump of the HST is improved to enhance the durability and operational efficiency thereof while being reduced in size and costs.

To achieve the object, in a first aspect of the IHT of the present invention, the HST comprises a variable displacement hydraulic pump driven by a prime mover and a hydraulic motor fluidly connected to the hydraulic pump, wherein the hydraulic pump is provided with a trunnion type movable swash plate, and wherein an internal displacement of the hydraulic motor is different from an internal displacement of the hydraulic pump. The difference of internal displacement between the hydraulic pump and motor such as not to synchronize the rotational frequency of the motor to that of the pump is advantageous to reduce vibration and noise. The trunnion type movable swash plate does not have a surface slidably contacting a surface of another member such as a retainer or a housing, thereby being efficiently movable and facilitating for the IHT in reduction of size and costs and in enhancement of durability.

Preferably, the internal displacement of the hydraulic motor is larger than the internal displacement of the hydraulic pump so as to increase the hydraulic deceleration activity of the HST. The increase of hydraulic deceleration activity, i.e., deceleration ratio of the HST facilitates for reduction of components, such as gears, of a mechanical deceleration drive train interposed between the HST and the axle in size or number.

To make the internal displacement of the hydraulic motor larger than the internal displacement of the hydraulic pump, preferably, each of the hydraulic pump and motor comprises a cylinder block having cylindrical bores, and pistons reciprocally fitted into the respective cylindrical bores of the cylinder block, wherein the total volume of the cylindrical bores of the hydraulic motor is larger than the total volume of the cylindrical bores of the hydraulic pump.

While the internal displacement of the hydraulic motor is larger than the internal displacement of the hydraulic pump so as to increase the hydraulic deceleration activity of the HST, preferably, the IHT further comprises a mechanical deceleration drive train interposed between the hydraulic motor and the axle, wherein the mechanical deceleration activity of the mechanical deceleration drive train is reduced so far as the increase of the hydraulic deceleration activity of the HST. The reduction of the mechanical deceleration activity, i.e., deceleration ratio of the mechanical deceleration drive train is directed to reduction of components thereof in size or number, thereby facilitating for reduction of noise, size and costs of the IHT.

While the internal displacement of the hydraulic motor is larger than the internal displacement of the hydraulic pump so as to increase the hydraulic deceleration activity of the HST, preferably, a motor shaft is interposed between the hydraulic motor and the mechanical deceleration drive train, wherein an end surface of the motor shaft is disposed between both end surfaces of the cylinder block.

A second object of the present invention is to provide an IHT comprising a housing incorporating an HST and an axle, wherein the HST is improved to facilitate for its reduction of noise and variation, and a motor shaft of a hydraulic motor of the HST is improved to enhance the efficiency of transmitting power to the axle (through a mechanical deceleration drive train).

To achieve the second object, in a second aspect of the IHT of the invention, the HST comprises a variable displacement hydraulic pump driven by a prime mover, and a hydraulic motor fluidly connected to the hydraulic pump, the hydraulic motor including a cylinder block and a motor shaft, wherein an end surface of the motor shaft is disposed between both end surfaces of the cylinder block, and wherein an internal displacement of the hydraulic motor is different from an internal displacement of the hydraulic pump. The difference of internal displacement between the hydraulic pump and motor such as not to synchronize the rotational frequency of the motor to that of the pump is advantageous to reduce vibration and noise. The arrangement of the end surface of the motor shaft between both of end surfaces of cylinder block is directed to shortening of the motor shaft so as to enhance the efficiency of transmitting power from the cylinder block to the motor shaft, thereby facilitating for minimization of the HST with the hydraulic pump and motor having the different internal displacements.

Preferably, the internal displacement of the hydraulic motor is larger than the internal displacement of the hydraulic pump so as to increase the hydraulic deceleration activity of the HST. The increase of hydraulic deceleration activity, i.e., deceleration ratio of the HST facilitates for reduction of components, such as gears, of a mechanical deceleration drive train interposed between the HST and the axle in size or number.

To make the internal displacement of the hydraulic motor larger than the internal displacement of the hydraulic pump, preferably, each of the hydraulic pump and motor comprises a cylinder block having cylindrical bores, and pistons reciprocally fitted into the respective cylindrical bores of the cylinder block, wherein the total volume of the cylindrical bores of the hydraulic motor is larger than the total volume of the cylindrical bores of the hydraulic pump.

While the internal displacement of the hydraulic motor is larger than the internal displacement of the hydraulic pump so as to increase the hydraulic deceleration activity of the hydrostatic transmission, preferably, the IHT further comprises a mechanical deceleration drive train interposed between the motor shaft and the axle, wherein the mechanical deceleration activity of the mechanical deceleration drive train is reduced so far as the increase of the hydraulic deceleration activity of the HST. The reduction of the mechanical deceleration activity, i.e., deceleration ratio of the mechanical deceleration drive train is directed to reduction of components thereof in size or number, thereby facilitating for reduction of noise, size and costs of the IHT.

These, further and other objects, features and advantages will appear more fully from the following description with reference to accompanying drawings.

DETAILED DESCRIPTION OF THE INVENTION

Figure 1:
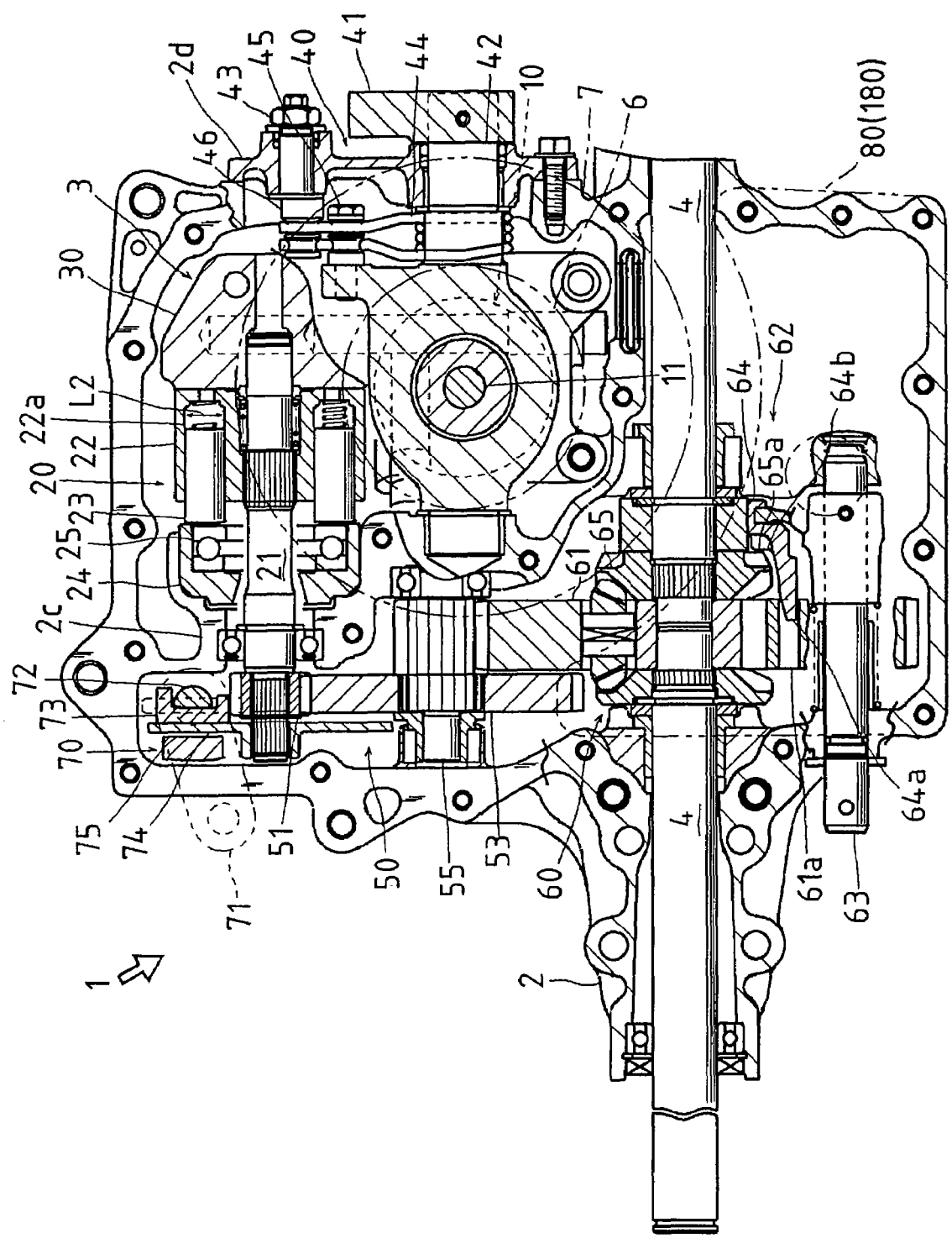
FIG. 1 is a plan view partly in section of an integrated hydraulic transaxle (IHT) from which an upper housing member is removed according to the present invention.

An IHT (integrated hydraulic transaxle) 1 will be described mainly with reference to FIGS. 1 and 2.

IHT 1 comprises a housing 2 constituted by upper and lower divisional housing members 2a and 2b joined to each other through a horizontal joint surface. Left and right lateral axles 4 are supported by upper housing member 2a above the horizontal joint surface. Alternatively, housing 2 may be constituted by left and right divisional members joined to each other through a vertical surface perpendicular to axles 4.

Housing 2 incorporates an HST (hydrostatic transmission) 3, a mechanical deceleration drive train (deceleration gearing) 50, a differential gearing 60 and a braking system 70. A pump displacement controlling unit 40 is assembled to housing 2.

HST 3 comprises a hydraulic pump 10, a hydraulic motor 20, and a center section 30, wherein hydraulic pump 10 and motor 20 are mutually fluidly connected through center section 30. Hydraulic motor 20 having a horizontal motor shaft 21 is mounted onto a vertical surface of center section 30 so as to arrange motor shaft 21 in parallel to axles 4, and hydraulic pump 10 having a vertical pump shaft 11 is mounted upright on center section 30 so as to be disposed between axles 4 and hydraulic motor 20. Differential gearing 60 is disposed around proximal end portions of axles 4 so as to differentially connect axles 4 to each other. Deceleration gearing 50 is interposed between motor shaft 21 and differential gearing 60 beside HST 3 along one of left and right side walls of housing 2 (in FIG. 1, along the left side wall). An internal partition 2c made of housing 2 separates a chamber for HST 3 from a chamber for deceleration gearing 50, differential gearing 60, braking system 70 and axles 4.

Pump shaft 11 of hydraulic pump 10 projects upward from housing 2 so as to serve as an input shaft fixedly provided thereon with an input pulley 6 and a cooling fan 7. Input pulley 6 is drivingly connected to an output pulley of an engine via a belt.

Variable displacement hydraulic pump 10 comprises a cylinder block 12, pistons 13, and a trunnion type movable swash plate 14. Cylinder block 12 is provided therein with an axial center hole into which pump shaft 11 is not-relatively rotatably fitted. Cylinder block 12 is farther provided therein with a plurality of piston holes 12a around the axial center hole in parallel.

Pistons 13 are reciprocally fitted into respective piston holes 12a through respective biasing springs. Swash plate 14 is provided with a thrust bearing 15 against which heads of pistons 13 are pressed. Swash plate 14 has a central opening through which pump shaft 11 is freely rotatably passed.

Pump displacement controlling unit 40 is operatively connected to swash plate 14 so as to tilt swash plate 14, thereby adjusting the displacement of hydraulic pump 10, i.e., the amount of oil delivered from pump 10 to motor 20, and changing the direction of oil flow between pump 10 and motor 20.

Upper housing member 2a has an outward opening covered with a side cover 2d in its side wall (in FIG. 1, the right side wall) laterally opposite to deceleration gearing 50. Pump displacement controlling unit 40 is an assembly including side cover 2d, a pair of coaxial trunnion shafts 42 and a speed control lever 41, assembled together with swash plate 14. As shown in FIG. 2, swash plate 14 has a pair of downwardly extended opposite tab portions 14a to which respective trunnion shafts 42 are fixed. One of trunnion shafts 42 (first trunnion shaft 42) is journalled by side cover 2d, and fixedly provided on an outer end portion thereof with speed control lever 41. A neutral returning spring 44 is wound around first trunnion shaft 42 between swash plate 14 and side cover 2d. Movable swash plate 14 has a pin 45 projecting in parallel to trunnion shaft 42. An eccentric shaft 46 parallel to trunnion shaft 42 is passed through side cover 2d and screwed up together with side cover 2d by an adjuster nut 43 provided thereon outside side cover 2d. Both ends of spring 44 are extended so as to pinch pin 45 and an inner end portion of eccentric shaft 46.

When pump displacement controlling unit 40 is assembled to housing 2, swash plate 14 is inserted into housing 2 through the side opening of upper housing member 2a, the other trunnion shaft (second trunnion shaft) 42 is rotatably supported into partition 2c, and side cover 2d is disposed to cover the side opening of upper housing member 2a and fastened to upper housing member 2a with bolts. In pump displacement controlling unit 40 completely assembled to housing 2, speed control lever 41 fixed on first trunnion shaft 42 is disposed outside housing 2 so as to be operatively connected to a speed controlling device on a vehicle. Eccentric shaft 46 can be rotated by screwing adjuster nut 43 thereon outside housing 2 so as to be correctly positioned at the proximal end portion thereof pinched by spring 44 in correspondence to the neutral position of swash plate 14.

By rotating speed control lever 41, trunnion shafts 42 are rotated together with swash plate 14 so as to change the displacement of pump 10 or change the oil delivery direction of pump 10. Pin 45 on swash plate 14 pushes one extended end of spring 44 apart from the other extended end of spring 44 retained by eccentric shaft 46, thereby generating a biasing force for returning swash plate 14 to the neutral position.

As mentioned above, pump displacement controlling unit 40 including swash plate 14 is an assemble facilitating to be easily attached or detached to and from IHT 1. In comparison with a cradle type movable swash plate, trunnion type swash plate 14 does not require such a complicated processing of housing 2 as to provide a slide surface contacting swash plate 14 required by the cradle type swash plate, thereby saving costs, and being free from contaminant obstructive to the movement and neutral-location of the swash plate.

Center section 30 is fastened to housing 2 by bolts so as to be spaced at the bottom surface thereof from an inner bottom surface of housing 2. An oil filter 31 is interposed between the bottom surface of center section 30 and the inner bottom surface of housing 2. A pair of oil ducts 32 and 33 are bored in center section 30 so as to circulate oil between hydraulic pump 10 and motor 20 mounted on center section 30. A pair of check valves 34 are disposed in center section 30 so as to allow oil to flow into respective oil ducts 32 and 33 through oil filter 31 from an oil sump in housing 2.

Fixed displacement hydraulic motor 20 comprises a cylinder block 22, pistons 23, and a fixed swash plate 24. Cylinder block 22 is provided therein with an axial center hole into which motor shaft 21 is not-relatively rotatably fitted. Cylinder block 22 is further provided therein with a plurality of piston holes 22a around the axial center hole in parallel. Pistons 23 are reciprocally fitted into respective piston holes 22a through respective biasing springs. Swash plate 24 is provided with a thrust bearing 25 against which heads of pistons 23 are pressed. Swash plate 24 has a central opening through which motor shaft 21 is freely rotatably passed.

In a usual HST, internal displacements of pump and motor are equal to each other so that the maximum rotary speeds of the pump and motor are equal to each other. In this state, reciprocation of pistons in a cylinder block of the pump is synchronous to reciprocation of pistons in a cylinder block of the motor, thereby generating large vibration and noise.

In HST 3, according to the present embodiment, the internal displacement of pump 10 is different from that of motor 20, so as not to synchronize the rotational frequency of pump 10 to that of motor 20, thereby reducing vibration and noise.

More specifically, the internal displacement of motor 20 is set larger than the internal displacement of pump 10. The total volume of piston holes 12a or 22a defines the internal displacement of each of pump 10 and motor 20. The amount of oil flow through each of pump 10 and motor 20 is determined in proportion to the total volume of piston holes 12a or 22a.

While the number and axial lengths of piston holes 22a in motor cylinder block 22 are equal to those of piston holes 12a in pump cylinder block 12, a diameter L2 of each piston hole 22a is longer than a diameter L1 of each piston hole 12a so that the internal displacement of motor 20 is larger than that of pump 10. Of course, pistons 23 are diametrically larger than pistons 13, so as to correspond to such piston holes 22a.

Alternatively, the fixed angle of swash plate 24 may be increased so as to increase the stroke of pistons 23, or piston holes 22a may be increased in number to be more than piston holes 12a. Furthermore, washers may be inserted in respective piston holes 12a so as to reduce the total volume of piston holes 12a to a level less than that of piston holes 22a. Any manner may be used for making the internal displacement of motor 20 larger than that of pump 10.

It is assumed that, when hydraulic pump 10 (pump shaft 11) is rotated at a constant speed, and its effective displacement is set to a fixed value (its movable swash plate is fixed to a certain position), hydraulic pump 10 supplies oil to a conventional hydraulic motor, whose internal displacement is equal to pump 10, and hydraulic motor 20, whose displacement is larger than that of each of hydraulic pump 10 and of the conventional hydraulic motor, respectively. The rotary speed of motor 20 (motor shaft 21) becomes smaller than that of the conventional motor (its motor shaft). In other words, the deceleration ratio between hydraulic pump 10 and motor 20 (the rotational speed ratio of pump shaft 11 to motor shaft 21) is larger than that between hydraulic pump 10 and the conventional hydraulic motor. Further specifically, the hydraulic deceleration activity of HST 3, in which the internal displacement of motor 20 is larger than that of pump 10, is enhanced in comparison with the hydraulic deceleration activity of a conventional HST in which the hydraulic pump and motor have an internal displacement equal to that of pump 10.

Deceleration gearing 50 comprises gears 51, 53 and 54 and a counter shaft 55. Gear 51 is fixed on a portion of motor shaft 21 projecting into the chamber for deceleration gearing 50 from the chamber for HST 3 through partition 2c. Counter shaft 55 is rotatably supported by an outer side wall and partition 2c of housing 2 and disposed in parallel between motor shaft 21 and axles 4. Gear 53, which is diametrically larger than gear 51, is fixed on counter shaft 55 so as to constantly mesh with gear 51. Differential gear 60 has a bull gear 61. Gear 54, which is diametrically smaller than bull gear 61, is fixed on counter shaft 55 adjacent to gear 53 so as to constantly mesh with bull gear 61.

Differential gearing 60 is provided with a differential locking system 62. Differential locking system 62 comprises a pushpin 63 and a locking member 64. Pushpin 63 is disposed in parallel to axles 4 and projects at a distal end out of housing 2. By pushing the distal end of pushpin 63 outside housing 2, pushpin 63 is axially moved and switched between a locking position and an unlocking position. Locking member 64 is axially slidably fitted on one axle 4 (in FIG. 1, right axle 4) and connected to pushpin 63 so as to axially move integrally with pushpin 63. Locking member 64 has a claw 64a constantly inserted into a hole 61a bored in bull gear 61 so as to rotate integrally with bull gear 61. In differential gearing 60, a differential side gear 65 fixed on (right) axle 4 is formed with recesses 65a. Locking member 64 has clutch teeth 64b.

When pushpin 63 is set in the locking position, clutch teeth 64b are fitted into respective recesses 65a so as to lock (right) axle 4 to bull gear 61 through locking member 64, thereby locking axles 4 to each other. When pushpin 63 is set in the unlocking position, clutch teeth 64b are disposed out of recesses 65a so as to separate (right) axle 4 from locking member 64, thereby ensuring the differential connection of axles 4.

Figure 3:
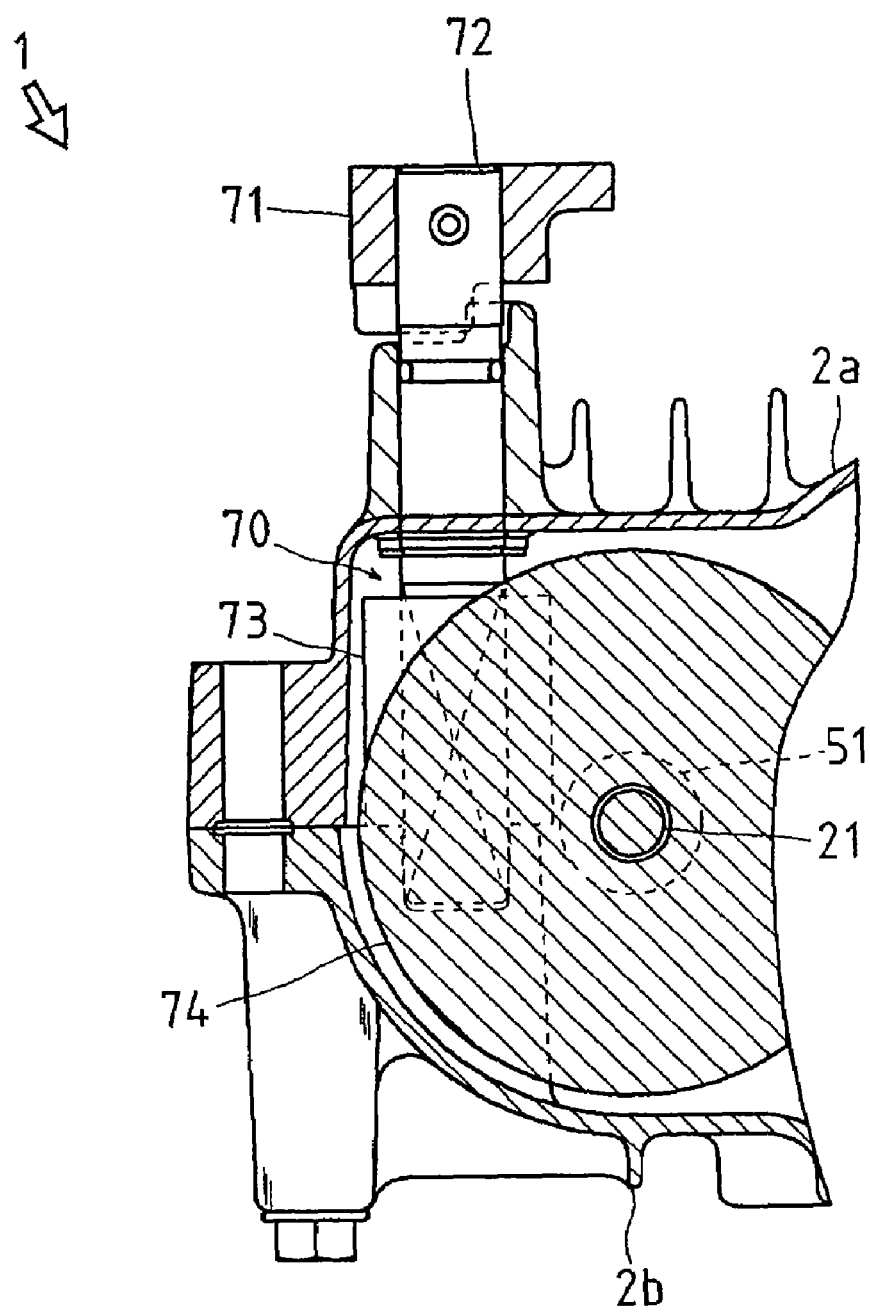
FIG. 3 is a sectional side view of the above showing a braking system.

Referring to FIGS. 1 and 3, braking system 70 is constructed around an end portion of motor shaft 21 adjacent to gear 51. Brake system 70 comprises a brake arm 71, a camshaft 72, a pressure plate 73 and a brake disk 74. A top portion of vertical camshaft 72 projects upward from housing 2 so as to be fixedly provided thereon with a brake arm 71 operatively connected to a braking operation device (such as a brake pedal) on a vehicle. Camshaft 72 has a sectionally semicircular cam portion contacting pressure plate 73. Brake disk 74 is fixed on the end portion of motor shaft 21. Pressure plate 73 is disposed between brake disk 74 and camshaft 72. By rotating brake arm 71 and camshaft 72, the cam portion of camshaft 72 pushes and moves pressure plate 73, whereby pressure plate 73 is pressed against brake disk 74 so as to brake motor shaft 21. A brake pad 75 is disposed between brake disk 74 and the side wall of housing 2 so as to cushion brake disk 74 when braked.

In IHT 1 having the above structure, the engine power (rotational force of input shaft (pump shaft) 11) while transmitted to axles 4 is decelerated by the hydraulic deceleration activity of HST 3 and the mechanical deceleration activity of deceleration gearing 50.

The driving of gears of a deceleration gearing between an HST and axles is one of major cause for noise generated from an IHT. Reduction of engine speed may be taken into account to reduce the noise. However, in IHT 1, the mechanical deceleration activity, i.e., the deceleration ratio of deceleration gearing 50 is reduced by reducing the gears thereof in size or in number, thereby reducing noise generated from IHT 1. Such reduction of the gears in size or number is also advantageous in reduction of costs for making IHT 1.

As mentioned above, the hydraulic deceleration activity, i.e., the deceleration ratio of HST 3 is increased so as to compensate for the reduction of the mechanical deceleration activity of deceleration gearing 50, thereby ensuring a sufficient torque for driving axles 4. Conversely speaking, the enhance of the hydraulic deceleration activity of HST 3, which causes the reduction of noise from HST 3 itself, also enables the reduction of the mechanical deceleration activity of deceleration gearing 50.

Figure 2:
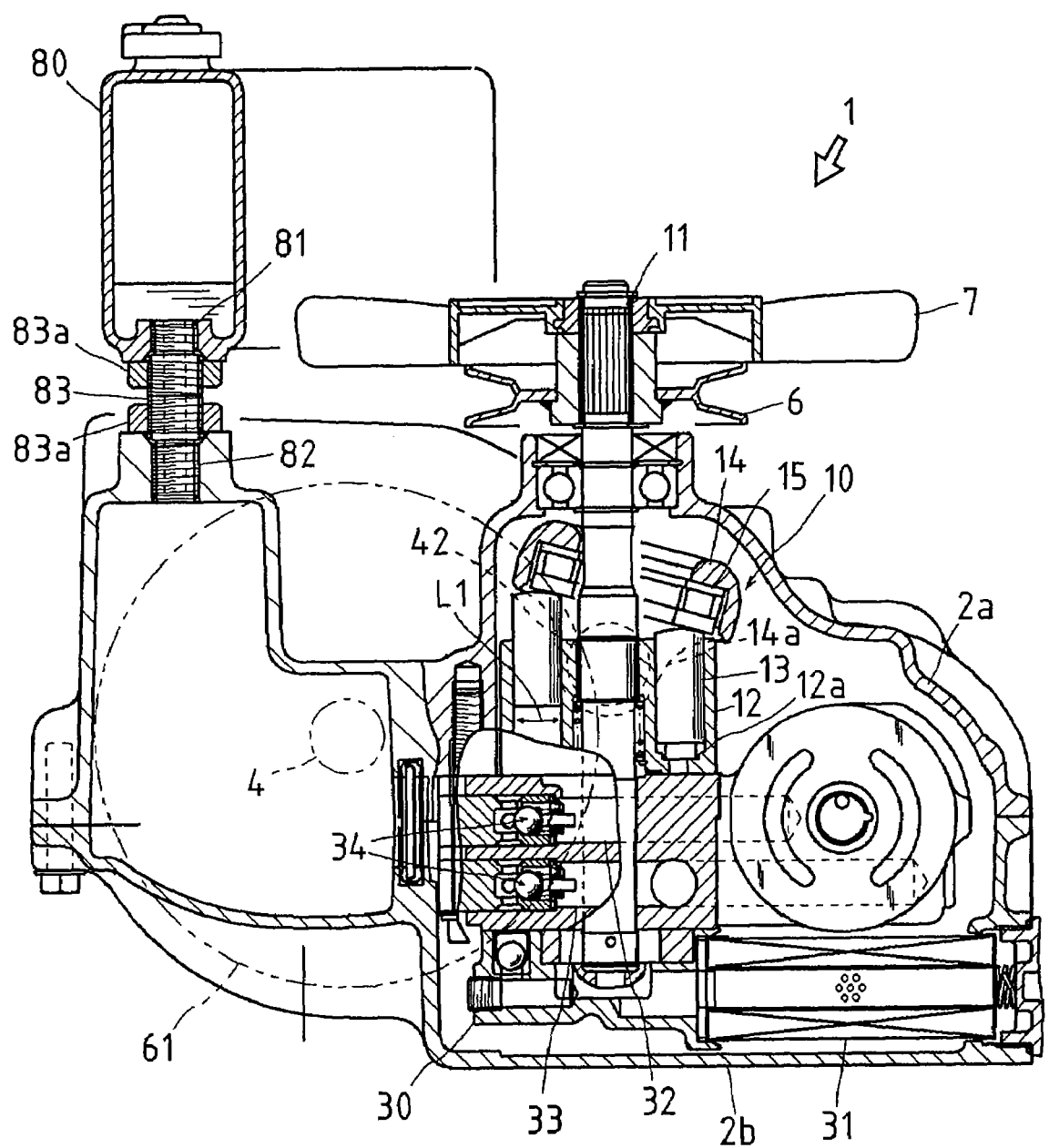
FIG. 2 is a sectional side view of the above.
Figure 4:
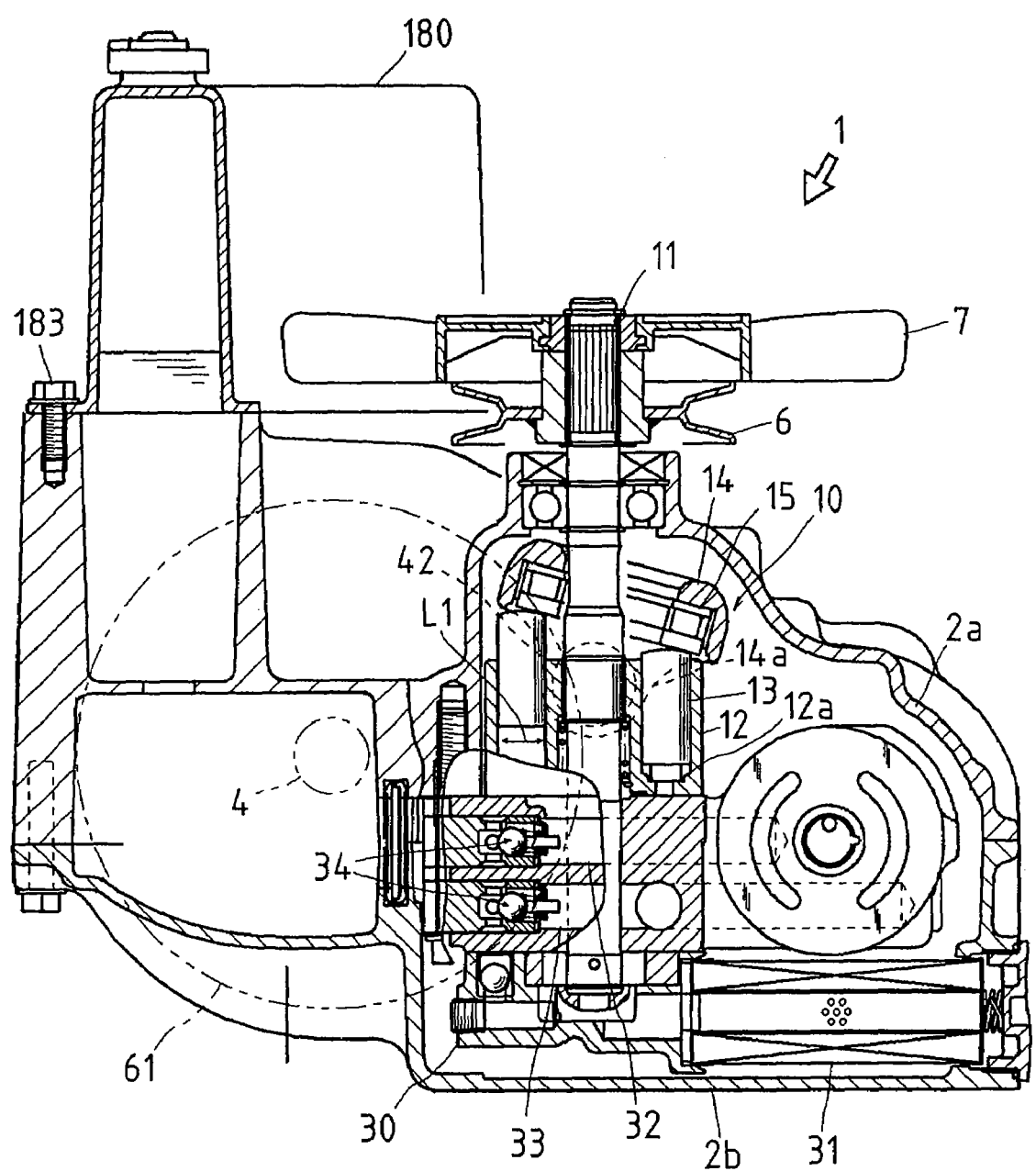
FIG. 4 is a sectional side view of the above when provided with another reservoir tank.

Referring to FIGS. 1, 2 and 4, variation of reservoir tanks applied to IHT 1 will now be described.

Referring to FIG. 1, a reservoir tank 80 or 180 is mounted upright on the top of housing 2 above axles 4 and differential gearing 60 so as to absorb the expansion of oil sump in housing 2 caused by heat from acting HST 3. When viewed in plan, a portion of reservoir tank 80 or 180, adjacent to cooling fan 7 and pulley 6, is curved along the periphery of circular locus of cooling fan 7 so as to avoid interfering with cooling fan 7 and pulley 6. Due to external reservoir tank 80 or 180, IHT 1 incorporating HST 3, deceleration gearing 50 and differential gearing 60 is compacted.

Preferably, the material (such as metal) of housing 2 or a heat-resistant synthetic resin is selected for separating reservoir tank 80 or 180 from housing 2. Synthetic resin is advantageous for the easy forming of a reservoir tank having a complicated shape. Alternatively, housing 2 may be partly formed into a reservoir tank having the same function as reservoir tanks 80 and 180.

Referring to FIG. 2, reservoir tank 80 has a closed bottom surface in which only a vertical port 81 is open. While the bottom surface of reservoir tank 80 is spaced from the closed top surface of upper housing member 2a, port 81 is pointed coaxially to a vertical port 82 bored in the top wall of upper housing member 2a so as to bring the interior of reservoir tank 80 into fluidal communication with the oil sump in housing 2. Ports 81 and 82 are threaded and a cylindrical bolt 83 is screwed in between ports 81 and 82. Upper and lower nuts 83a are screwed on an external intermediate portion of bolt 83 between reservoir tank 80 and upper housing member 2a, thereby fastening reservoir tank 80 to housing 2. By loosening nuts 83a, reservoir tank 80 can be easily removed from housing 2 so as to facilitate maintenance.

Referring to FIG. 4, reservoir tank 180, serving as an upper half of an oil reservoir, has a substantially entirely open bottom surface. Upper housing member 2a is formed with a lower half of the oil reservoir having an open top surface. Reservoir tank 180 is mounted on upper housing member 2a so as to fit a bottom edge of reservoir tank 180 along the open bottom surface onto a top edge of upper housing member 2a along the open top surface, and fastened to upper housing member 2a with bolts 183. When reservoir tank 180 is completely mounted on housing 2, the open bottom surface of reservoir tank 180 coincides with the open top surface of housing 2, thereby forming an oil reservoir between reservoir tank 180 and upper housing member 2a, which is streamlined in comparison with reservoir tank 80 spaced above housing 2. In other words, reservoir tank 180, looking like a part of housing 2, has a clear appearance, which is emphasized if reservoir tank 180 is made of the same (metal) material with that of housing 2. Reservoir tank 180 may be easily and economically made of synthetic resin.

Fitting of the inner end of motor shaft 21 into hydraulic motor 20 will now be described. Firstly, the fitting of motor shaft 21 shown in FIG. 1, and then, the fitting of short motor shaft 21 shown in FIGS. 5 to 26 will be described.

Motor shaft 21 shown in FIG. 1 is spline-fitted in cylinder block 22.

The inner end portion of motor shaft 21 having the substantially same diameter with that of the spline portion is further extended from the spline portion thereof through cylinder block 22 and slidably rotatably fitted into a fitting hole of center section 30. Incidentally, as mentioned above, the outer end portion of motor shaft 21 projecting from partition 2c is supported between the outer side wall of housing 2 and partition 2c so as to be not-relatively rotatably provided thereon with gear 51 and brake disk 74.

Motor shaft 21 shown in FIG. 1 is so axially long as to be fitted into center section 30. Further, the extended inner portion of motor shaft 21 is diametrically as large as the spline portion thereof. Therefore, the area of outer peripheral surface of the inner end portion of motor shaft 21 frictionally contacting the inner peripheral surface of the fitting hole in center section 30 is considerably large, thereby reducing the power transmission efficiency from cylinder block 22 to motor shaft 21.

Shortening of motor shaft 21, for reducing or vanishing the peripheral surface area thereof contacting center section 30, is effective to increase the efficiency of transmitting power between cylinder block 22 and motor shaft 21 and to further minimize HST 3. Although the shortening of motor shaft 21 serving as an input shaft of deceleration gearing 50 causes reduction of durability thereof, there is a room for shortening motor shaft 21 because the gears of deceleration gearing 50, reduced in size or number for reducing the deceleration ratio, can be sufficiently driven by shortened motor shaft 21 reduced in durability. However, a new problem arises how cylinder block 22 is surely pivotally supported on center section 30.

Each of motor shafts 21 shown in FIGS. 5 to 26 is shortened and has a spline portion 21a serving as the inner end thereof, which is spline-fitted to an axial intermediate portion of cylinder block 22. Namely, the inner end surface of motor shaft 21 is disposed between both end surfaces of cylinder block 22. Even if motor shaft 21, as shown in FIGS. 13, 14, 21 and 22, has a portion 21c extended toward center section 30 from spline portion 21a, the end surface of the extended portion 21c is disposed between both end surfaces of cylinder block 22. Each embodiment of FIGS. 5 to 26 uses means for pivotally supporting cylinder block 22 to center section 30 instead of motor shaft 21.

Shortened and lightened motor shaft 21 has no outer peripheral surface frictionally contacting center section 30, thereby enhancing the efficiency of transmitting rotational power from cylinder block 22 to motor shaft 21 in comparison with motor shaft 21, as shown in FIG. 1, which is so long as to be fitted into center section 30.

Each of hydraulic motors 20 shown in FIGS. 5 to 26, in which the inner end surface of motor shaft 21 is disposed between both end surfaces of cylinder block 22, will be described.

Figure 5:
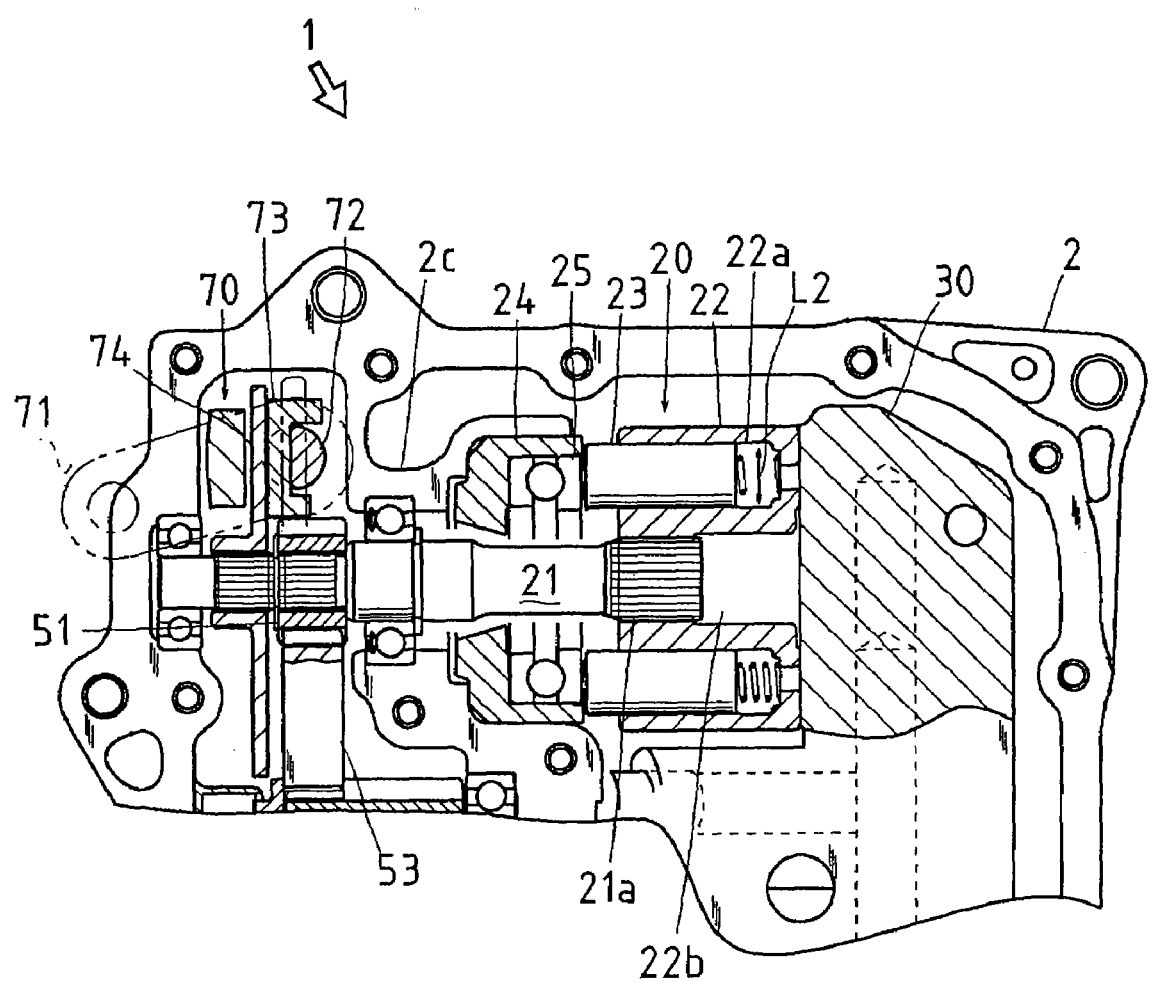
FIG. 5 is an enlarged fragmental plan view partly in section of the IHT with the upper housing member removed, showing the basic structure of supporting a shortened motor shaft in a hydraulic motor.

FIG. 5 shows a basic structure of supporting short motor shaft 21 in hydraulic motor 20. Spline portion 21a, serving as the inner end of motor shaft 21, is spline-fitted to the axial intermediate portion of cylinder block 22. The end surface of spline portion 21a (the inner end surface of motor shaft 21) is spaced from a surface of center section 30 fitting cylinder block 22 by an axial hole 22b of cylinder block 22. Such an arrangement of axial hole 22b is applied in each of embodiments shown in FIGS. 6 to 26 excluding FIGS. 17 and 18 in which no axial hole 22b is disposed between the inner end surface of motor shaft 21 and the surface of center section 30 fitting cylinder block 22 but the axial portion of cylinder block 22 therebetween is solid.

Figure 6:
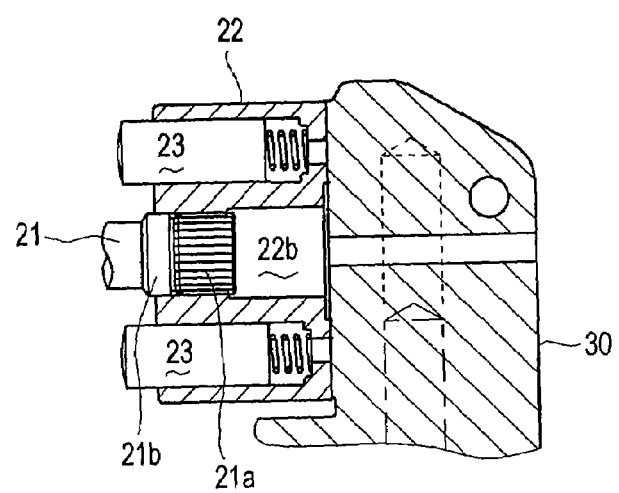
FIG. 6 is a sectional plan view of the hydraulic motor having the basic structure of supporting the shortened motor shaft, wherein a spline portion of the motor shaft is reshaped so as to have a guide portion.

As shown in FIG. 6, a part of spline portion 21a of motor shaft 21 may be smoothened on the outer peripheral surface so as to serve as a guide portion 21b for leading spline portion 21a into cylinder block 22. Spline portion 21a of motor shaft 21 shown in each of FIGS. 7 to 26 may be similarly reshaped.

When motor shaft 21 is supported by cylinder block 22 as shown in FIG. 5 (or 6), motor shaft 21 is separated from center section 30, thereby causing the questions of how hydraulic motor 20 is centered to center section 30, and how cylinder block 22 is slidably and rotatably fitted onto center section 22. The preferred embodiments of FIGS. 7 to 26 give various answers.

Figure 7:
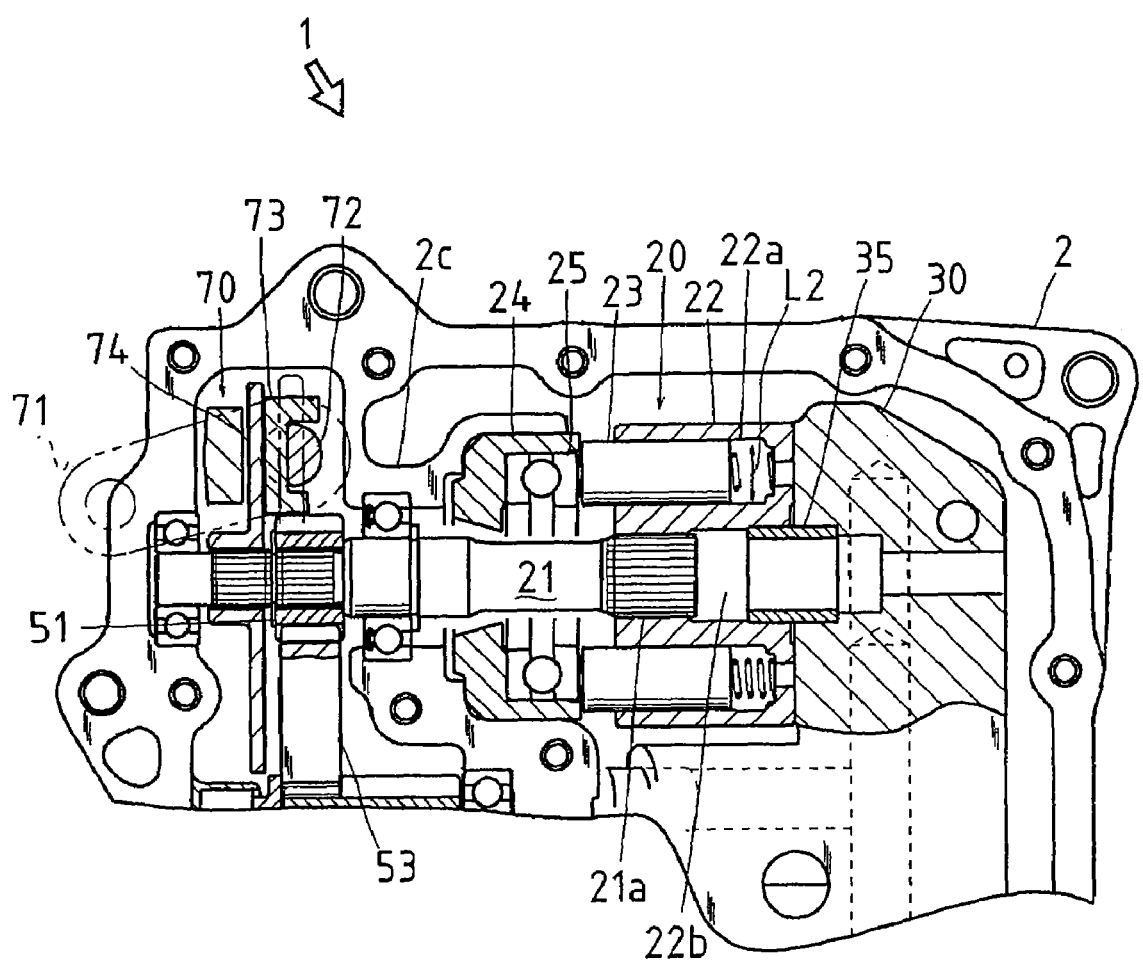
FIG. 7 is an enlarged fragmental plan view partly in section of the IHT with the upper housing member removed, showing a reshaped structure of supporting the shortened motor shaft in the hydraulic motor.

Referring to FIG. 7, center section 30 is bored by an axial hole, which is continuously extended from axial hole 22b of cylinder block 22 when cylinder block 22 is fitted onto center section 30. A thrust bearing 35 is fitted across in both of the axial holes of center section 30 and cylinder block 22, that is, slidably abut at the outer peripheral surface thereof against the inner peripheral surfaces of axial hole 22b and the axial hole of center section 30. Namely, thrust bearing 35 serves as means for location of the axis of cylinder block 22 relative to center section 30, and also serves as a pivot of cylinder block 22 relative to center section 30. Thrust bearing 35 shown in FIG. 7 is cylindrical (hollow), however, it may be solid.

Figure 8:
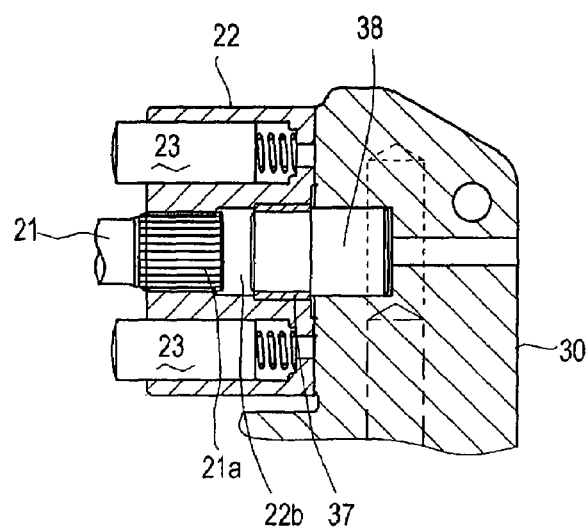
FIGS. 8 to 26 are sectional plan views of the hydraulic motors having various structures of supporting the shortened motor shafts and cylinder blocks.

Referring to FIG. 8, instead of thrust bearing 35, a solid axial member 38 externally fitted with a cylindrical thrust bearing 37 is applied. Axial member 38 has a diametrically large portion fitted into the axial hole of center section 30. The remaining portion of axial member 38 fitted into axial hole 22b of cylinder block 22 is diametrically smaller than the diametrically large portion. Thrust baring 37 is interposed between the outer peripheral surface of the diametrically smaller portion of axial member 38 and the inner peripheral surface of axial hole 22b.

Figure 9:
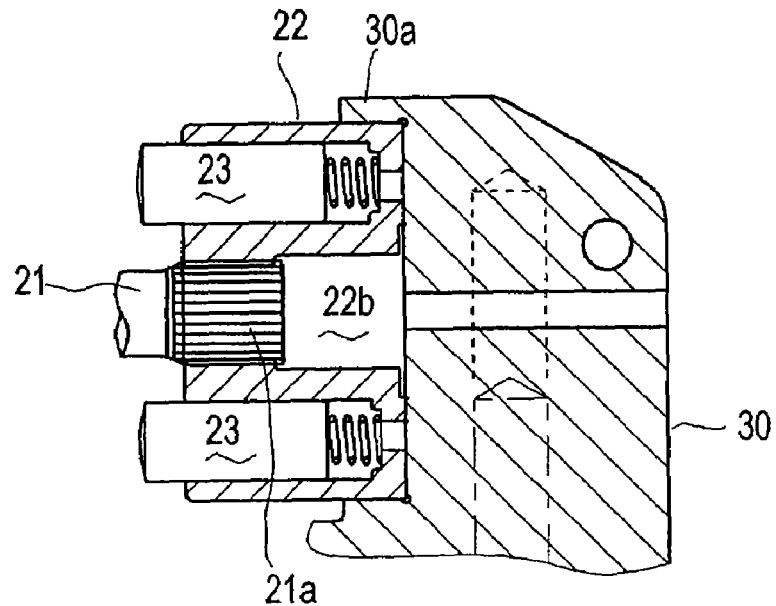
Figure 10:
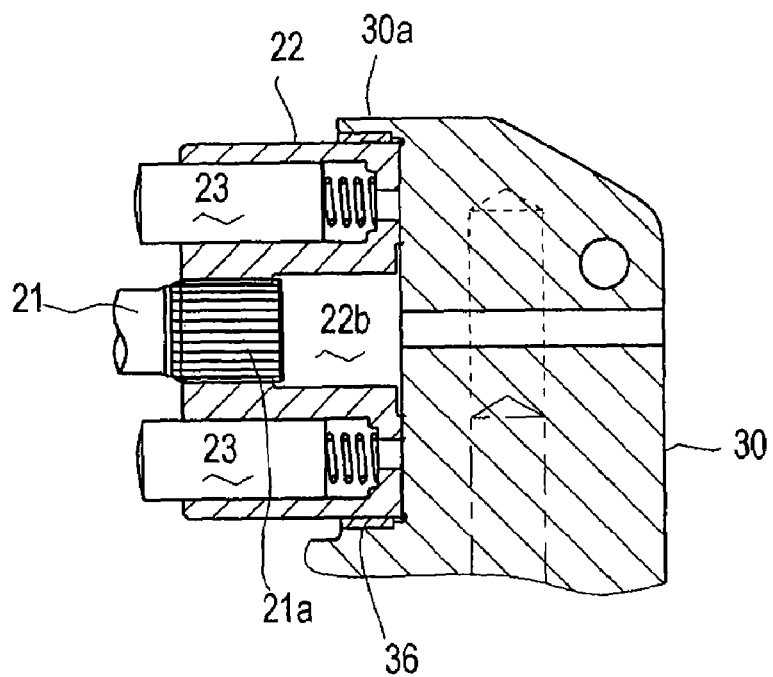

In each of FIGS. 7 and 8, the inner peripheral surface of axial hole 22b of cylinder block 22 slidably abuts against the thrust bearing extended from center section 30. On the other hand, in each of FIGS. 9 and 10, the outer peripheral surface of cylinder block 22 partly serves as a slidably abutting surface. Referring to each of FIGS. 9 and 10, center section 30 is formed with an annular projection 30a rounding the outer peripheral edge of cylinder block 22. Referring to FIG. 9, the inner peripheral surface of annular projection 30a directly slidably abuts against the outer peripheral surface of cylinder block 22. Referring to FIG. 10, an annular thrust bearing 36 is interposed between annular projection 30a and the outer peripheral surface of cylinder block 22.

Figure 11:
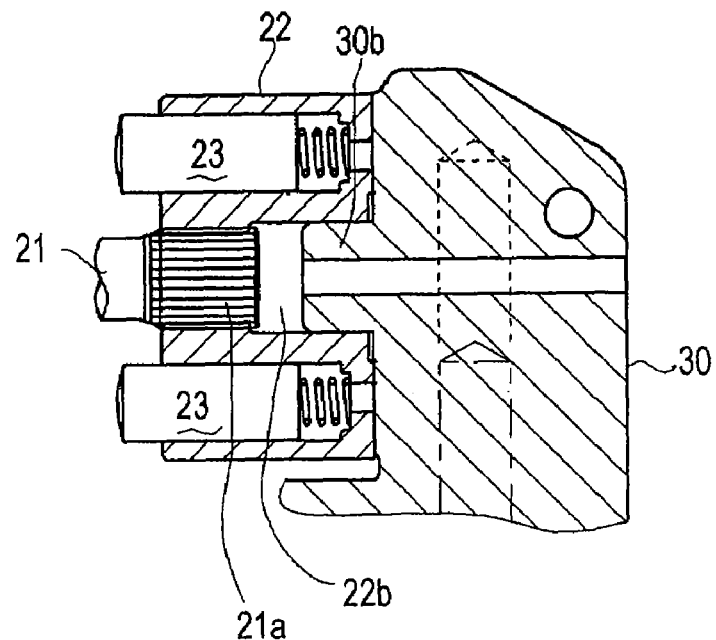
Figure 12:
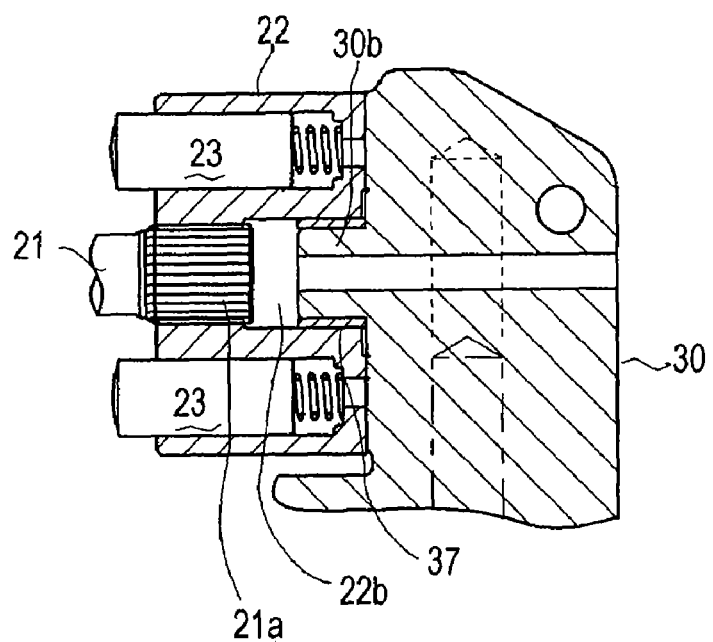

Referring to each of FIGS. 11 and 12, the inner peripheral surface of axial hole 22b of cylinder block 22 serves as a slide guide surface while center section 30 is partly extended to form a projection 30b inserted into axial hole 22b. Referring to FIG. 11, the outer peripheral surface of projection 30b directly slidably abuts against the inner peripheral surface of axial hole 22b. Referring to FIG. 12, an annular thrust bearing 37 is interposed between the outer peripheral surface of projection 30b and the inner peripheral surface of axial hole 22b.

Figure 13:
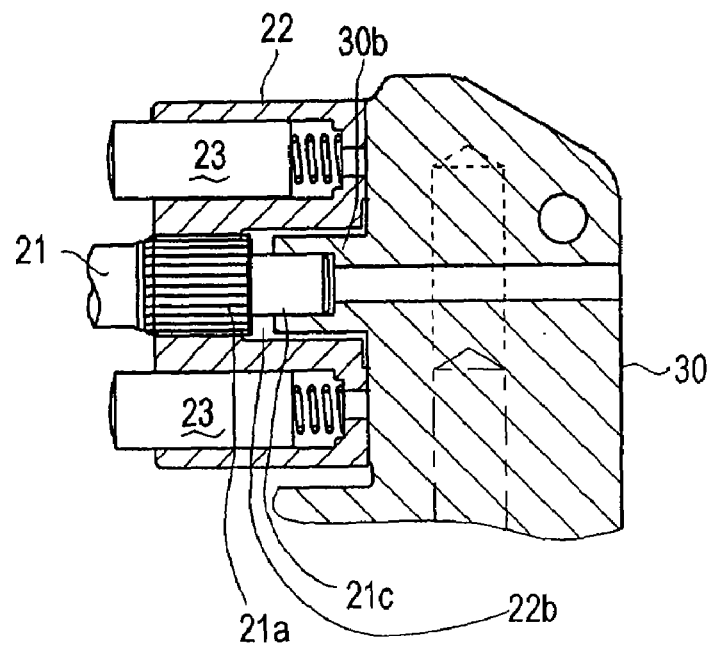
Figure 14:
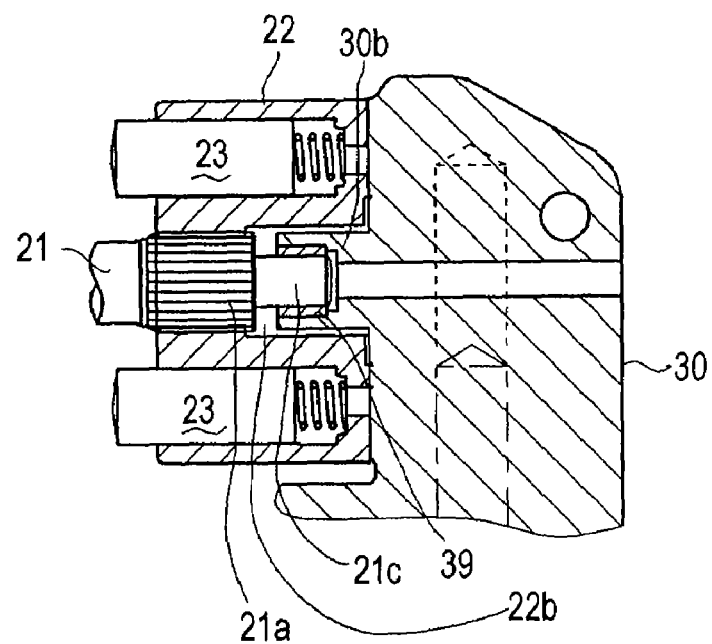

Referring to each of FIGS. 13 and 14, center section 30 has projection 30b inserted into axial hole 22b of cylinder block 22, similar to each of FIGS. 11 and 12. However, the outer peripheral surface of projection 30b is spaced from the inner peripheral surface of axial hole 22b (thrust bearing 37 is not even disposed therebetween). Consequently, cylinder block 22 slidably and rotatably abuts against only the vertical flat surface of center section 30. In compensation, motor shaft 21 has a diametrically small end portion 21c extended toward center section 30 from spline portion 21a and slidably rotatably fitted into projection 30b. Referring to FIG. 13, the outer peripheral surface of extended end portion 21c of motor shaft 21 directly abuts against the inner peripheral surface of projection 30b. Referring to FIG. 14, a thrust bearing 39 is interposed between the outer peripheral surface of extended end portion 21c and the inner peripheral surface of projection 30b.

Figure 15:
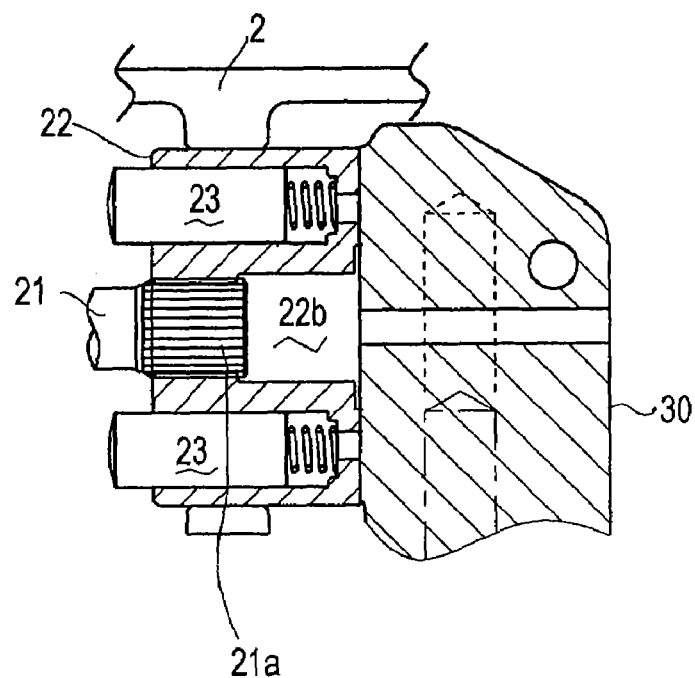
Figure 16:
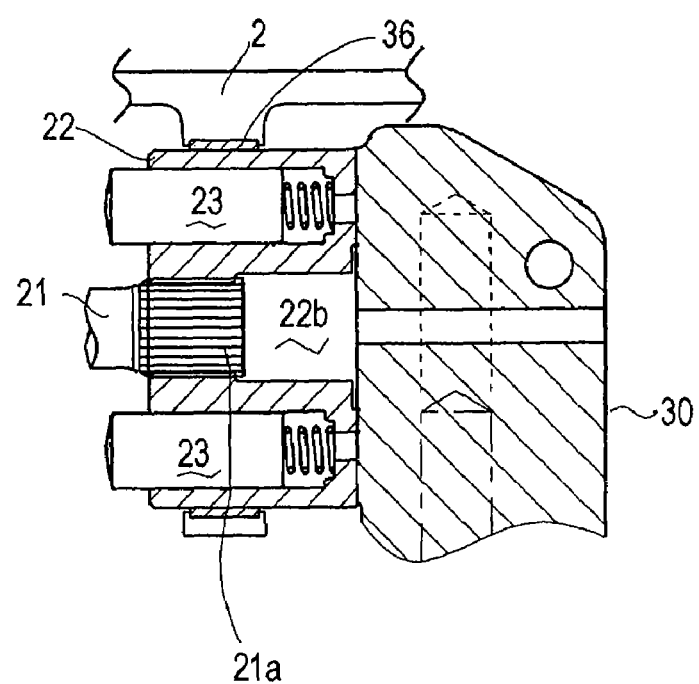

Referring to each of FIGS. 15 and 16, cylinder block 22 is relatively rotatably supported by a part of housing 2. Referring to FIG. 15, the outer peripheral surface of cylinder block 22 directly abuts against the part of housing 2. Referring to FIG. 16, thrust bearing 36 is interposed between the outer peripheral surface of cylinder block 22 and the part of housing 2.

Figure 17:
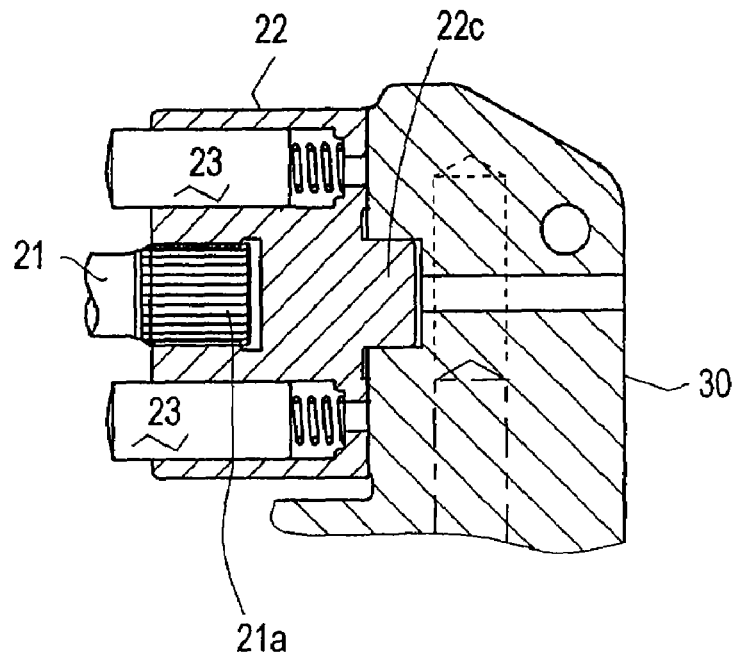
Figure 18:
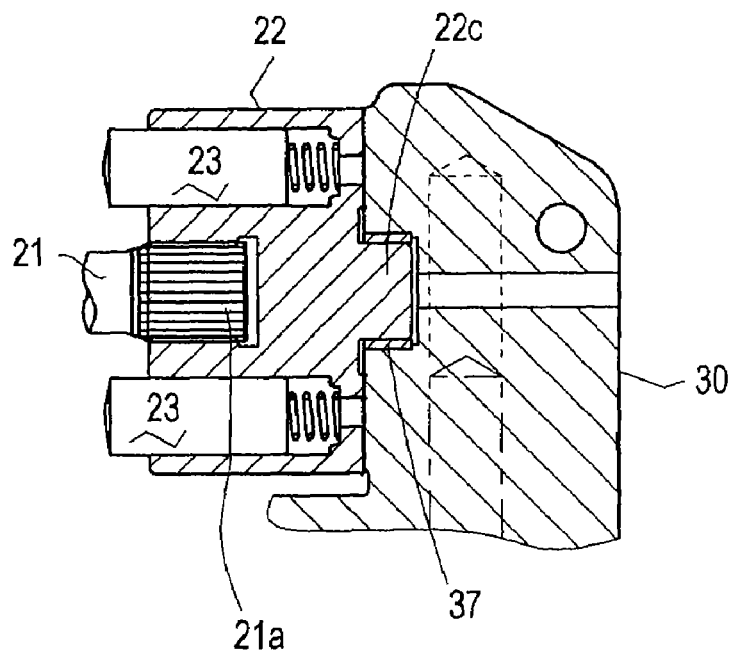

Referring to each of FIGS. 17 and 18, the axial portion of cylinder block 22 between the inner end surface of motor shaft 21 (the end surface of spline portion 21b) and center section 30 is solid (without axial hole 22b). Cylinder block 22 has an axial projection 22c inserted into the axial hole bored in center section 30. Referring to FIG. 17, the outer peripheral surface of axial projection 22c of cylinder block 22 directly abuts against the inner peripheral surface of the axial hole of center section 30. Referring to FIG. 18, annular thrust bearing 37 is interposed between the outer peripheral surface of axial projection 22c and the inner peripheral surface of the axial hole of center section 30.

Figure 19:
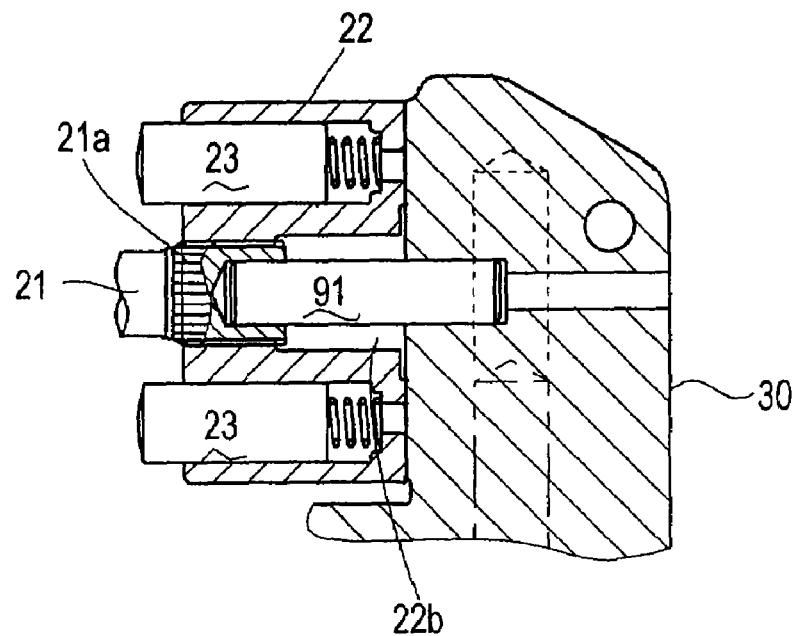
Figure 20:
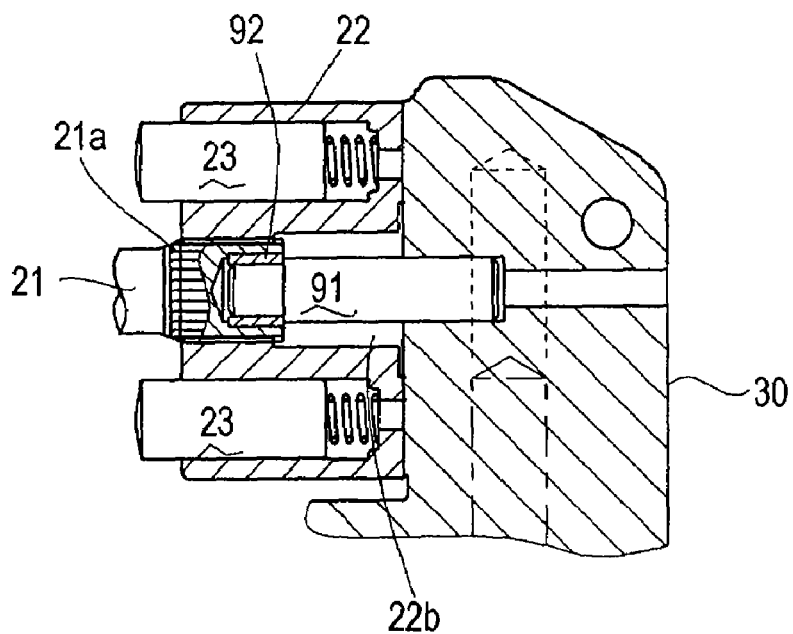

Referring to each of FIGS. 19 and 20, an axial hole is formed in spline portion 21 a of motor shaft 21, and an axial hole is bored in center section 20 so as to face the axial hole in spline portion 21a through axial hole 22b. An axial member 91 is inserted at both ends thereof into the axial holes of motor shaft 21 and center section 30, respectively, through axial hole 22b. One end of axial member 91 directly slidably abuts at the outer peripheral surface thereof against the inner peripheral surface of the axial hole of center section 30. Referring to FIG. 19, the other end of axial member 91 directly slidably abuts at the outer peripheral surface thereof against the inner peripheral surface of the axial hole of spline portion 21a of motor shaft 21. Referring to FIG. 20, an annular thrust bearing 92 is interposed between the outer peripheral surface of the other end of axial member 91 and the inner peripheral surface of the axial hole of spline portion 21a of motor shaft 21.

Figure 21:
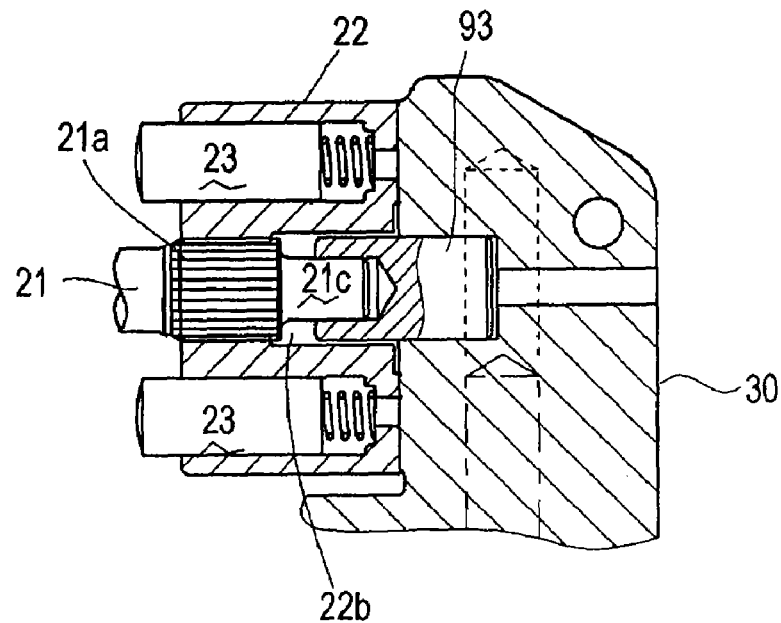
Figure 22:
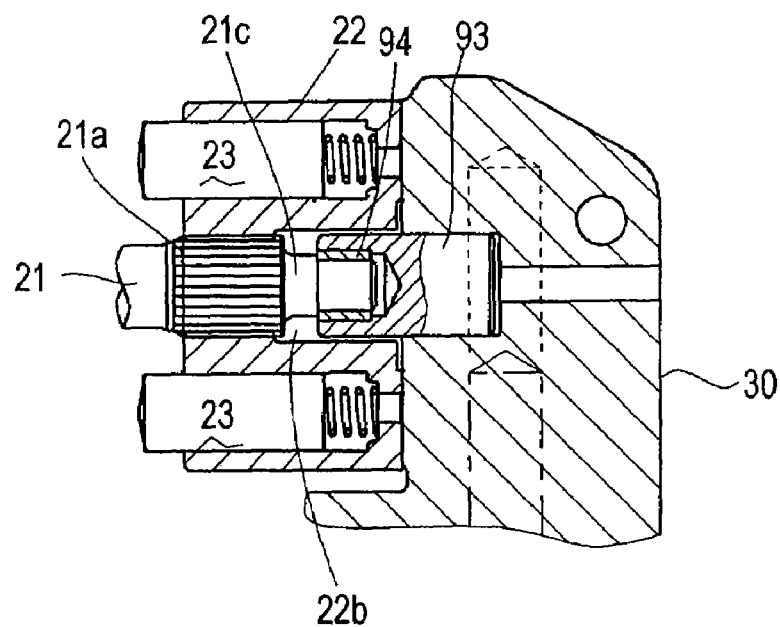

Referring to each of FIGS. 21 and 22, an axial member 93 is disposed across in axial hole 22b of cylinder block 22 and an axial hole of center section 30 formed coaxially to axial hole 22b. The outer peripheral surface of axial member 93 directly slidably abuts against the inner peripheral surface of the axial hole of center section 30, however, it is spaced from the inner peripheral surface of axial hole 22b. Motor shaft 21 has end portion 21c extended toward center section 30 from spline portion 21a and inserted into an axial hole formed in a portion of axial member 93 in axial hole 22b. Referring to FIG. 21, the outer peripheral surface of extended end portion 21c of motor shaft 21 directly slidably abuts against the inner peripheral surface of the axial hole of axial member 93. Referring to FIG. 22, an annular thrust bearing 94 is interposed between the outer peripheral surface of extended end portion 21c and the inner peripheral surface of the axial hole of axial member 93.

Figure 23:
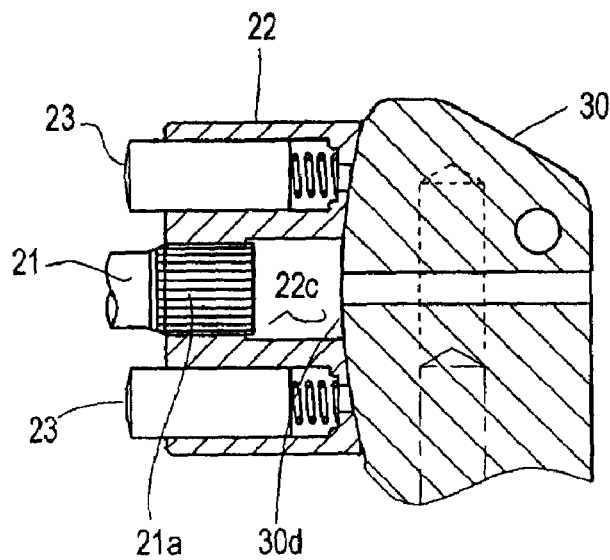
Figure 24:
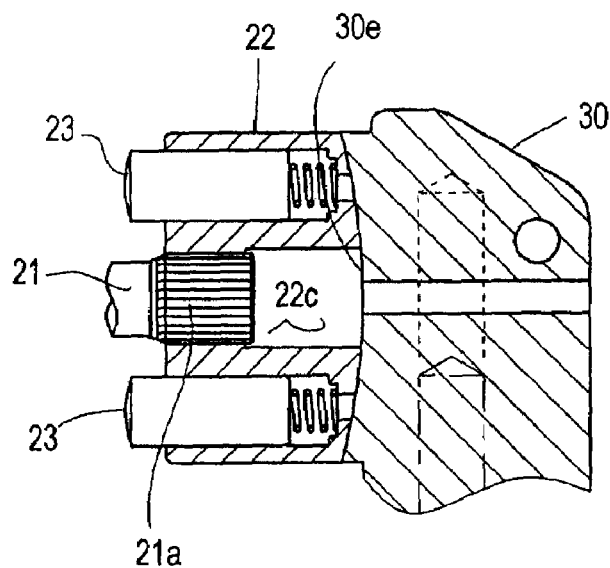

Referring to each of FIGS. 23 and 24, surfaces of cylinder block 22 and center section 30 slidably rotatably abutting against each other are concaved and convexed. Referring to FIG. 23, the surface of center section 30 fitted to motor 20 is convex, and correspondingly, the surface of cylinder block 22 slidably rotatably abutting against the surface of center section 30 is concave. Referring to FIG. 24, the surface of center section 30 fitted to motor 20 is concave, and correspondingly, the surface of cylinder block 22 slidably rotatably abutting against the surface of center section 30 is convex. Even if hydraulic motor 20 and center section 30 are shaped to fit each other in this way, the axial location of cylinder block 22 relative to center section 30 is ensured.

Figure 25:
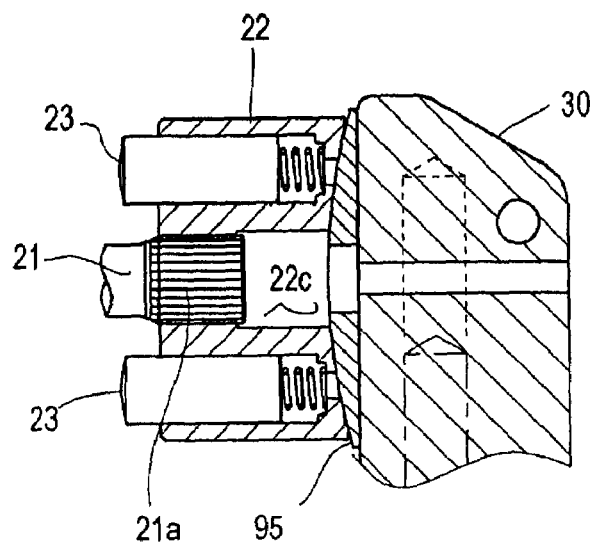
Figure 26:
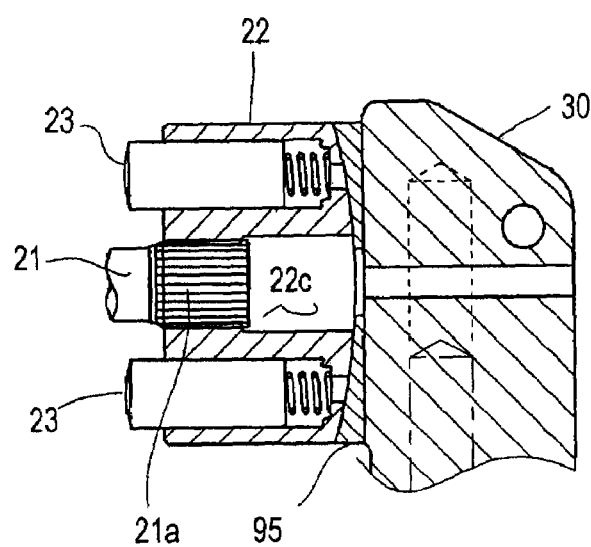

Referring to each of FIGS. 25 and 26, a surface of cylinder block 22 facing center section 30 is concaved or convexed, similar to that of cylinder block 22 of each of FIGS. 23 and 24. However, the vertical surface center section 30 facing cylinder block 22 is flat, and a convex or concave valve plate 95 or 96 is interposed between the concave or convex surface of cylinder block 22 and the flat surface of center section 30. Referring to FIG. 25, a concave surface of cylinder block 22 slidably rotatably abuts against the convex surface of valve plate 95. Referring to FIG. 26, a convex surface of cylinder block 22 slidably rotatably abuts against the concave surface of valve plate 96.

Each of foresaid motor shafts 21, as shown in FIGS. 5 to 26, has an end, which is not extended to center section 30, but is disposed in an axial intermediate portion of cylinder block 22, thereby being shortened so as to reduce load on driving of hydraulic motor 20. Incidentally, cylinder block 22 with pistons 23 is sandwiched between thrust bearing 25 of swash plate 24 and center section 30 so as to ensure its slidably rotatable fitting to center section 30.

Although the invention has been described in its preferred form, with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:
1. A transaxle, comprising:
a housing formed therein with a fluid sump;
an axle supported by the housing;
a hydrostatic transmission disposed in the housing, the hydrostatic transmission including an output shaft;
a bull gear disposed on the axle so as to drivingly connect the output shaft to the axle; and
a reservoir tank removably mounted onto a portion the housing containing the bull gear, wherein the reservoir tank is fluidly connected to the fluid sump when the reservoir tank is mounted onto the portion of the housing, wherein the reservoir tank includes a downward opening, and the portion of the housing includes an upward opening, and wherein the upward and downward openings are disposed to coincide with each other so as to fix the reservoir tank onto the portion of the housing.

2. The transaxle according to claim 1, further comprising:
a pipe-shaped joint fixing the reservoir tank onto the portion of the housing.

3. A transaxle, comprising:
a housing formed therein with a fluid sump;
an axle supported by the housing;
a hydrostatic transmission disposed in the housing, the hydrostatic transmission including an output shaft;
a bull gear disposed on the axle so as to drivingly connect the output shaft to the axle;
a reservoir tank removably mounted onto a portion the housing containing the bull gear, wherein the reservoir tank is fluidly connected to the fluid sump when the reservoir tank is mounted onto the portion of the housing, wherein the hydrostatic transmission includes an input shaft projecting outward from a side of the housing onto which the reservoir tank is mounted; and
a cooling fan disposed on the portion of the input shaft projecting output from the housing, wherein the reservoir tank includes an arcuate wall surrounding the cooling fan.

4. A transaxle comprising:
a housing formed therein with a fluid sump;
an axle supported by the housing;
a hydrostatic transmission disposed in the housing, the hydrostatic transmission including an output shaft;
a bull gear disposed on the axle so as to drivingly connect the output shaft to the axle; and
a reservoir tank removably mounted onto a horizontal surface of a top portion of the housing containing the bull gear so as to be disposed above the housing when the housing is equipped in a vehicle, wherein the reservoir tank is fluidly connected to the fluid sump when the reservoir tank is mounted onto the horizontal surface of the top portion of the housing.

5. The transaxle according to claim 4, further comprising:
a pipe-shaped joint fixing the reservoir tank onto the top portion of the housing.

6. The transaxle according to claim 4, wherein the reservoir tank includes a downward opening, and the top portion of the housing includes an upward opening, and wherein the upward and downward openings are disposed to coincide with each other so as to fix the reservoir tank onto the portion of the housing.

7. A transaxle comprising:
a housing formed therein with a fluid sump;
an axle supported by the housing;
a hydrostatic transmission disposed in the housing, the hydrostatic transmission including an output shaft;
a bull gear disposed on the axle so as to drivingly connect the output shaft to the axle; and
a reservoir tank removably mounted onto a top portion the housing containing the bull gear when the housing is equipped in a vehicle, wherein the reservoir tank is fluidly connected to the fluid sump when the reservoir tank is mounted onto the portion of the housing, wherein the hydrostatic transmission includes an input shaft projecting outward from a side of the housing onto which the reservoir tank is mounted,
a cooling fan disposed on the portion of the input shaft projecting output from the housing, wherein the reservoir tank includes an arcuate wall surrounding the cooling fan.

8. A transaxle comprising:
a housing formed therein with a fluid sump;
an axle supported by the housing;
a hydrostatic transmission disposed in the housing, the hydrostatic transmission including an output shaft;
a bull gear disposed on the axle so as to drivingly connect the output shaft to the axle; and
a reservoir tank removably mounted onto a top portion the housing containing the bull gear when the housing is equipped in a vehicle, wherein the reservoir tank is fluidly connected to the fluid sump when the reservoir tank is mounted onto the portion of the housing,
wherein the reservoir tank includes a downward opening, and the top portion of the housing includes an upward opening, and wherein the upward and downward openings are disposed to coincide with each other so as to fix the reservoir tank onto the portion of the housing.

* * * * *